(12) United States Patent
Verstockt et al.

(10) Patent No.: US 6,239,841 B1
(45) Date of Patent: May 29, 2001

(54) CLAMPING APPARATUS FOR FIXING A SMALL ELECTRONIC CAMERA ON AN LCD PANEL

(75) Inventors: Kris Verstockt, Taipei Hsien; Hui-Yi Lin, Taipei; Hsiao-Ying Lin, Taipei Hsien, all of (TW)

(73) Assignee: Primax Electronics Ltd., Taipei Hsien (TW)

( * ) Notice: Subject to any disclaimer, the term of this patent is extended or adjusted under 35 U.S.C. 154(b) by 0 days.

(21) Appl. No.: 09/399,088

(22) Filed: Sep. 20, 1999

(51) Int. Cl.[7] ............................... B60R 7/00; A47F 7/14; H04N 5/225; H04N 7/00
(52) U.S. Cl. ..................... 348/373; 348/375; 348/552; 248/918; 224/556
(58) Field of Search ................................ 348/552, 373, 348/375, 376; 248/229.26, 228.07, 230.07, 231, 918, 452; 224/556, 249, 673, 564, 908, 267; 361/679, 681, 682, 683

(56) References Cited

U.S. PATENT DOCUMENTS 5,260,731 * 11/1993 Baker, Jr. ........................... 248/231
5,855,343 * 1/1999 Krekelberg ........................... 248/918

* cited by examiner

Primary Examiner—Wendy R. Garber
Assistant Examiner—Rashawn N. Tillery
(74) Attorney, Agent, or Firm—Winston Hsu

(57) ABSTRACT

A clamp for fixing a small electronic device on an upper end of a rectangular panel. The upper end of the panel has a horizontal top end, a front edge and a rear edge, the front and rear edges being perpendicular to the top end of the panel. The clamp includes an L-shaped assembly, an elastic module, and a base. A vertical side at the front of the L-shaped assembly engages the top end and the front edge of the panel. An elastic module fixed at a rear end of the L-shaped assembly has an arc-shaped plate bending towards the rear edge of the panel so that the L-shaped assembly will attach tightly to the top end and the front edge of the panel. The base is fixed on the L-shaped assembly and is used to fix the small electronic device. When mounting the clamp to the upper end of the panel, the upper end of the panel will slip across the arc-shaped plate and be clamped between the arc-shaped plate and the L-shaped assembly of the clamp.

8 Claims, 2 Drawing Sheets

CLAMPING APPARATUS FOR FIXING A SMALL ELECTRONIC CAMERA ON AN LCD PANEL

BACKGROUND OF THE INVENTION

1. Field of the Invention

The present invention relates to a clamping apparatus, and more particularly, to a clamping apparatus for fixing a small electronic camera onto an LCD panel.

2. Description of the Prior Art

With the development of multimedia, the prices of small digital cameras have steadily dropped. In this new era, one need only add a small digital camera to a computer to broadcast images on a network. This small digital camera is usually mounted on top of the computer monitor, and some method to do so is required.

When using a small digital camera together with a notebook computer, a clamping apparatus is needed to fix the small camera on an upper end of the LCD panel of the notebook computer. And because the notebook computer is often folded up or carried, the clamping apparatus must be easy to install and remove. Various prior art methods for fixing a small digital camera onto the notebook computer exist, including adhesives, spring-loaded clamps and screws. However, some of these methods can damage the surface appearance of the notebook computer, and others are inconvenient to install and remove.

SUMMARY OF THE INVENTION

It is therefore a primary objective of the present invention to provide a clamping apparatus for fixing a small electronic camera onto an LCD panel to solve the above mentioned problems.

In a preferred embodiment, the present invention provides a clamping apparatus for fixing a small electronic device onto an upper end of a substantially rectangular panel, the upper end of the panel comprising a horizontal top end, a front edge and a rear edge, the front and rear edges being perpendicular to the top end of the panel, the clamping apparatus comprising:

an L-shaped assembly having a horizontal side and a vertical front side fixed at a front end of the horizontal side, the horizontal side and the front side of the L-shaped assembly being used for engaging the top end and the front edge of the panel;

an elastic module fixed at a rear end of the horizontal side of the L-shaped assemble having an elastic arc-shaped plate bending upward for engaging the rear edge of the panel so as to make the horizontal side and the front side of the L-shaped assembly attach tightly to the top end and the front edge of the panel; and a base fixed on the L-shaped assembly and positioned above its horizontal side for fixing the small electronic device;

wherein when mounting the clamping apparatus to the upper end of the panel, the upper end of the panel will slip across the arc-shaped plate and be clamped between the arc-shaped plate and the L-shaped assembly of the clamping apparatus.

It is an advantage of the present invention that the clamping apparatus of the present invention can be easily installed and removed from the panel, and it will not harm the surface of the panel.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
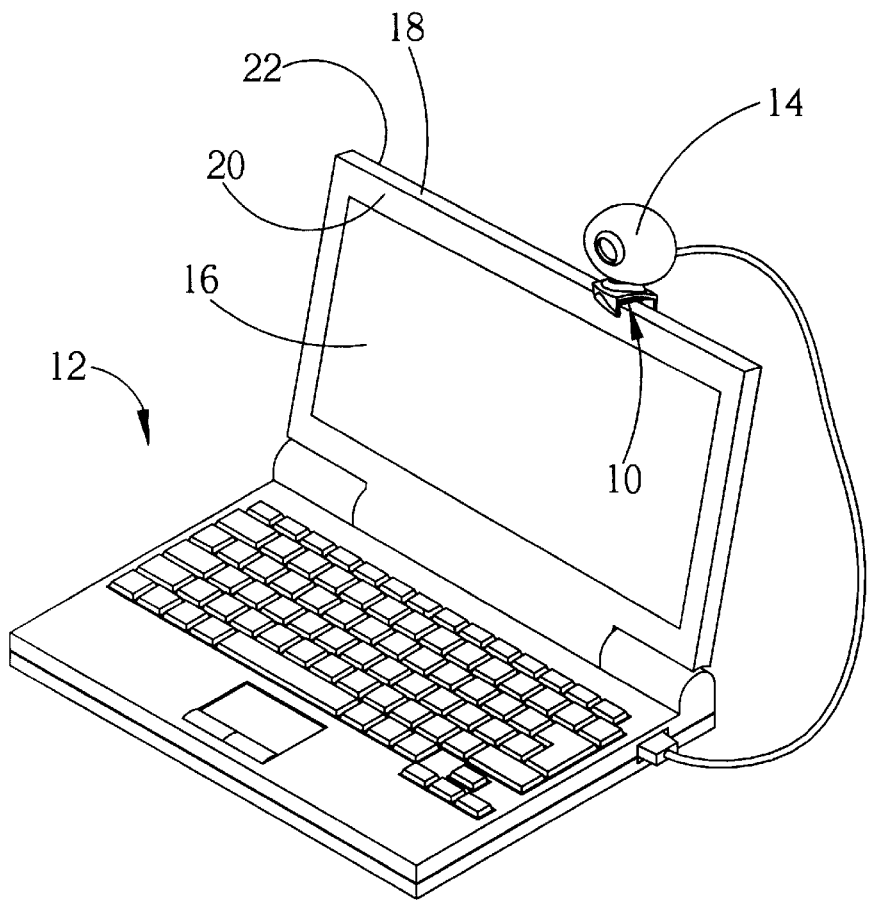
FIG. 1 is a perspective view of a clamping apparatus of the present invention installed on an upper end of a laptop display panel.
Figure 2:
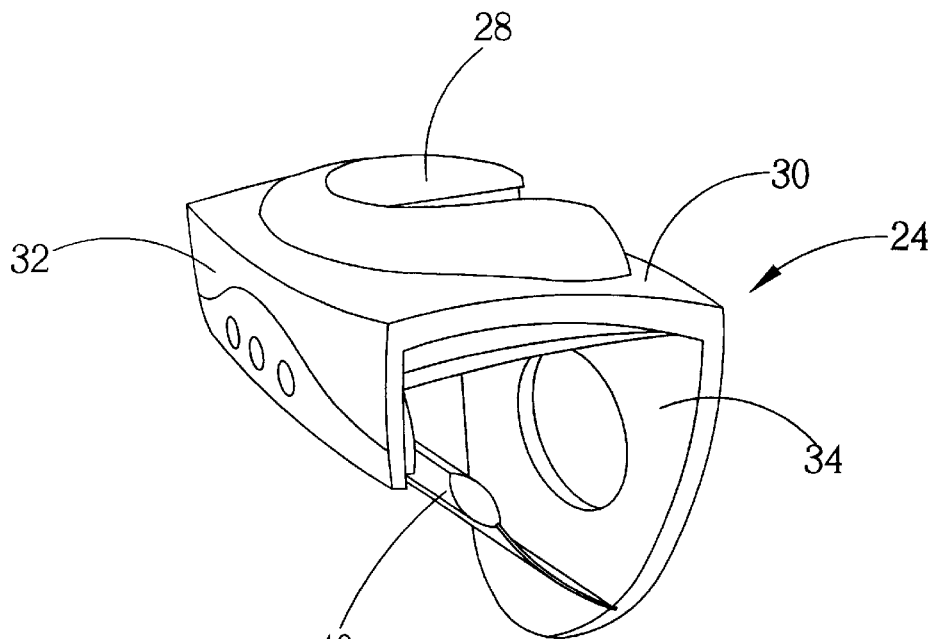
FIG. 2 is a perspective view of the clamping apparatus shown in FIG. 1.
Figure 3:
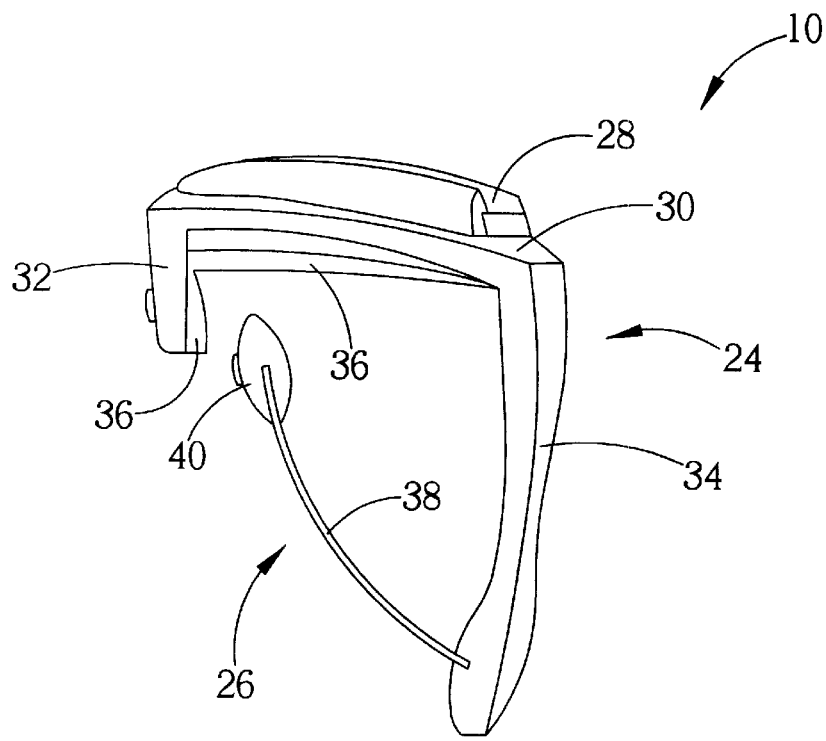
FIG. 3 is aside view of the clamping apparatus shown in FIG. 2.

Please refer to FIG. 1 and FIG. 2. FIG. 1 is a perspective view of a clamping apparatus 10 putted in practice according to the present invention. FIG. 2 is a perspective view of the clamping apparatus 10 shown in FIG. 1. FIG. 3 is a side view of the clamping apparatus 10. The clamping apparatus 10 is used for fixing a small electronic camera 14 on an upper end of an LCD panel 16 of a notebook computer 12. The upper end of the panel 16 comprises a horizontal top end 18, a front edge 20 and a rear edge 22. The front and rear edges 20, 22 are perpendicular to the top end 18 of the panel 16. The clamping apparatus 10 comprises an L-shaped assembly 24 (FIG. 3), an elastic module 26, and a base 28.

The L-shaped assembly 24 has a horizontal side 30, a vertical front side 32 fixed at a front end of the horizontal side 30 and a rear side 34 fixed at a rear end of the horizontal side 30. The horizontal side 30 and the front side 32 of the L-shaped assembly 24 are used to engage with the top end 18 and the front edge 20 of the panel 16. A protective layer 36, made of elastic material, is fixed to the horizontal side 30 and the front side 32 of the L-shaped assembly 24 for protecting the top end 18 and the front edge 20 of the panel 16.

The elastic module 26 has an elastic arc-shaped plate 38 installed at the rear side 34 of the L-shaped assembly 24 bending upward for engaging the rear edge 22 of the panel 16 so as to make the horizontal side 30 and the front side 32 of the L-shaped assembly 24 tightly attach to the top end 18 and the front edge 20 of the panel 16. A protective sheath 40 is installed on an upper end of the arc-shaped plate 38 to prevent the rear edge 22 of the panel 16 from being scratched by the arc-shaped plate 38. The protective sheath 40 is made of a soft material with a high surface friction. The base 28 is attached to the L-shaped assembly 24 and positioned above its horizontal side 30 for fixing the small electronic camera 14. The length of the arc-shaped plate 38 is long enough so that the protective sheath 40 is higher than the bottom lip of the front side 32 when the clamping apparatus 10 is installed. This ensures that the clamping forces are even, and so the clamping apparatus 10 will not tilt.

When mounting the clamping apparatus 10 to the upper end of the panel 16, the upper end of the panel 16 will slip across the arc-shaped plate 38 and be clamped between the arc-shaped plate 38 and the L-shaped assembly 24 of the clamping apparatus 10. Thus, mounting the small electronic camera 14 to the panel 16 is easily accomplished using the clamping apparatus 10.

Figure 4:
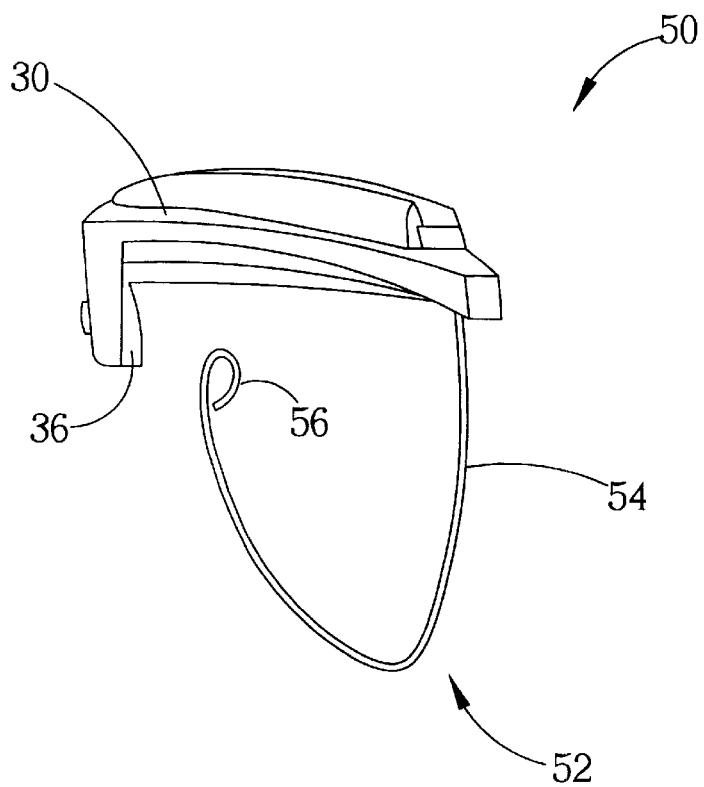
FIG. 4 is a side view of an alternative clamping apparatus according to the present invention.

Please refer to FIG. 4. FIG. 4 is a side view of an alternative clamping apparatus 50 according to the present invention. The difference between the clamping apparatus 50 and the clamping apparatus 10 is that the clamping apparatus 50 does not have the rear side 34, and the elastic module 52 is fixed at a rear end of the horizontal side 30. A curved edge 56 is installed at an upper end of the arc-shaped plate 54 to prevent the rear edge 22 of the panel 16 from being scratched by the upper end of the arc-shaped plate 54.

The clamping apparatuses 10, 50 of the present invention use an elastic arc-shaped plate 38, 54 which bend upward for engaging the rear edge 22 of the LCD panel 16 so as to make the apparatuses 10, 50 fit securely on the panel 16. When mounting the clamping apparatus 10, 50 to the upper end of the panel 16, the upper end of the panel 16 will slip across the arc-shaped plate 38, 54 and be clamped between the arc-shaped plate 38, 54 and the L-shaped assembly 24 of the clamping apparatus 10. Hence, it is very easy to mount or dismount the clamping apparatuses 10, 50 of the present invention. In addition, the clamping apparatus 10, 50 of the present invention has the protective layer 36, and the protective sheath 40 or the curved edge 56. These protective elements are designed to avoid damaging the surface appearance of the panel 16.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A clamping apparatus for fixing a small electronic device on an upper end of a substantially rectangular panel, the upper end of the panel comprising a horizontal top end, a front edge and a rear edge, the front and rear edges being perpendicular to the top end of the panel, the clamping apparatus comprising:

an L-shaped assembly having a horizontal side for engaging the top end of the panel, a vertical front side fixed at a front end of the horizontal side for engaging the front edge of the panel, and a rear side fixed at a rear end of its horizontal side, the vertical front side being perpendicular to the horizontal side;

an elastic module fixed at a lower end of the rear side of the L-shaped assembly having an elastic arc-shaped plate bending towards the rear edge of the panel so as to make the horizontal side and the front side of the L-shaped assembly attach tightly to the top end and the front edge of the panel; and a base fixed on the L-shaped assembly and positioned above its horizontal side for fixing the small electronic device;

wherein when mounting the clamping apparatus to the upper end of the panel, the upper end of the panel will slip across the arc-shaped plate and be clamped between the arc-shaped plate and the L-shaped assembly of the clamping apparatus.

2. The clamping apparatus of claim 1 wherein a protective sheath is installed on an upper end of the arc-shaped plate to prevent the rear edge of the panel from being scratched by the arc-shaped plate.

3. The clamping apparatus of claim 2 wherein the protective sheath is made of soft material with high surface friction.

4. The clamping apparatus of claim 1 wherein a curved edge is installed at an upper end of the arc-shaped plate for preventing the rear edge of the panel from being scratched by the upper end of the arc-shaped plate.

5. The clamping apparatus of claim 1 wherein a protective layer made of elastic material is installed on the horizontal side and the front side of the L-shaped assembly for protecting the top end and the front edge of the panel attached to it.

6. The clamping apparatus of claim 1 wherein the panel is an LCD panel of a notebook computer.

7. The clamping apparatus of claim 6 wherein the small electronic device is an electronic camera which is electrically connected to the notebook computer.

8. A clamping apparatus for fixing a small electronic device on an upper end of a substantially rectangular panel, the upper end of the panel comprising a horizontal top end, a front edge and a rear edge, the front and rear edges being perpendicular to the top end of the panel, the clamping apparatus comprising:

an L-shaped assembly having a horizontal side for engaging the top end of the panel, and a vertical front side fixed at a front end of the horizontal side in perpendicular with the horizontal side for engaging the front edge of the panel;

an elastic module fixed at a rear end of the horizontal side of the L-shaped assembly having an elastic arc-shaped plate bending towards the rear edge of the panel so as to make the horizontal side and the front side of the L-shaped assembly attach tightly to the top end and the front edge of the panel; and a base fixed on the L-shaped assembly and positioned above its horizontal side for fixing the small electronic device;

wherein when mounting the clamping apparatus to the upper end of the panel, the upper end of the panel will slip across the arc-shaped plate and be clamped between the arc-shaped plate and the L-shaped assembly of the clamping apparatus.

* * * * *